United States Patent
Petrick et al.

(10) Patent No.: US 7,300,029 B2
(45) Date of Patent: Nov. 27, 2007

(54) FLAT PANEL DISPLAY WALL MOUNTING SYSTEM

(75) Inventors: Christopher Petrick, Park Ridge, IL (US); Robert Coon, Chicago, IL (US); Jimmy-Quang Viet Doan, Chicago, IL (US); Scott Kouri, Long Grove, IL (US); Bjorn Gunderson, Chicago, IL (US); Nic Davirro, Chicago, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 15 days.

(21) Appl. No.: 11/409,761

(22) Filed: Apr. 24, 2006

(65) Prior Publication Data

US 2006/0261226 A1   Nov. 23, 2006

Related U.S. Application Data

(60) Provisional application No. 60/675,757, filed on Apr. 28, 2005.

(51) Int. Cl.
*E04G 3/00* (2006.01)

(52) U.S. Cl. ............ 248/285.1; 248/917; 248/921

(58) Field of Classification Search ............ 248/274.1, 248/284.1, 285.1, 292.13, 495, 917, 921, 248/922, 924; 211/99, 104
See application file for complete search history.

(56) References Cited

U.S. PATENT DOCUMENTS 2,965,339 A * 12/1960 Denton ............ 248/495

| 6,102,348 | A | 8/2000 | O'Neill |
| 6,557,813 | B1 * | 5/2003 | Duggan ............ 248/476 |
| 6,886,701 | B2 * | 5/2005 | Hong et al. ............ 211/99 |
| 2002/0179791 | A1 | 12/2002 | Kwon |
| 2003/0201372 | A1 | 10/2003 | Dozier |
| 2005/0061937 | A1 * | 3/2005 | Kim ............ 248/274.1 |

FOREIGN PATENT DOCUMENTS

| EP | 1 312 851 | 5/2003 |
| EP | 1 401 200 | 3/2004 |
| JP | 11344934 | 12/1999 |
| WO | WO 2005/004673 | 1/2005 |

OTHER PUBLICATIONS

International Search Report and Written Opinion dated Sep. 15, 2006 from corresponding PCT patent application No. PCT/CA2006/015823.

* cited by examiner

*Primary Examiner*—Ramon O Ramirez
(74) *Attorney, Agent, or Firm*—John C. Gorecki

(57) ABSTRACT

A flat panel display wall mounting system includes a wall plate assembly connected to a flat panel display mounting rack assembly. The wall plate assembly and the mounting rack assembly are able to be separated to facilitate mounting on a wall. Specifically, the wall plate assembly may mounted on a wall and leveled, while the mounting rack assembly may be attached to a flat panel display while still on the ground. The flat panel display may then be hung on the wall plate assembly. A pitch assembly is provided to adjust the pitch of the flat panel display once hung on the wall plate assembly. A pin connection mechanism is provided to enable the mounting rack assembly to be pivoted out from the wall plate assembly so that the rear area of the flat panel display may be accessed for servicing while the flat panel display is mounted on the wall mounting system.

19 Claims, 6 Drawing Sheets

FLAT PANEL DISPLAY WALL MOUNTING SYSTEM

CROSS-REFERENCE TO RELATED APPLICATIONS

This application claims the benefit of prior provisional application No. 60/675,757, filed Apr. 28, 2005, the content of which is hereby incorporated herein by reference.

BACKGROUND OF THE INVENTION

1. Field of the Invention

The present invention relates to display mounting systems and, more particularly, to a flat panel display wall mounting system.

2. Description of the Related Art

Flat panel displays, such as televisions and computer monitors, may be formed using many technologies. Currently, Liquid Crystal Displays (LCDs) and plasma displays are mass marketed as flat panel displays, although other flat panel display technologies also exist and may be developed over time.

Flat panel displays may be supported on desk stands, wall mounts, pole mounts, or may be supported in numerous other ways. For example, the displays may be mounted individually or in groups on a horizontal surface such as a desk, table, floor or ceiling, or may be mounted on a vertical surface such as a wall, cubicle, or other enclosure. Depending on the type of support system, the displays may be free standing or may be more directly connected to another surface such as a wall, ceiling, or other structure.

One type of flat panel display mounting system is designed to enable a range of sizes of flat panel displays to be mounted to a wall. However, once the flat panel display has been connected to the mounting system, it is difficult to access the back side of the flat panel display in connection with servicing the flat panel display.

SUMMARY OF THE INVENTION

A flat panel display wall mounting system includes a wall plate assembly connected to a flat panel display mounting rack assembly. The wall plate assembly and the flat panel display mounting rack assembly are able to be separately installed on the wall and the flat panel display and then the flat panel display may be hung on the wall plate assembly. The manner in which the flat panel display mounting rack assembly is connected to the wall plate assembly enables the pitch of a mounted flat panel display to be changed. One possible pitch adjustment mechanism includes a drivable threaded rod that, when rotated, will cause the pitch of the flat panel display to be adjusted. A pin connection mechanism is provided to enable the flat panel display mounting rack assembly to be partially separated from the wall plate assembly so that the rear area of the flat panel display may be accessed for servicing while the flat panel display remains supported by the wall plate.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, and dimensions, have not been described in detail so as not to obscure the invention.

Figure 1:
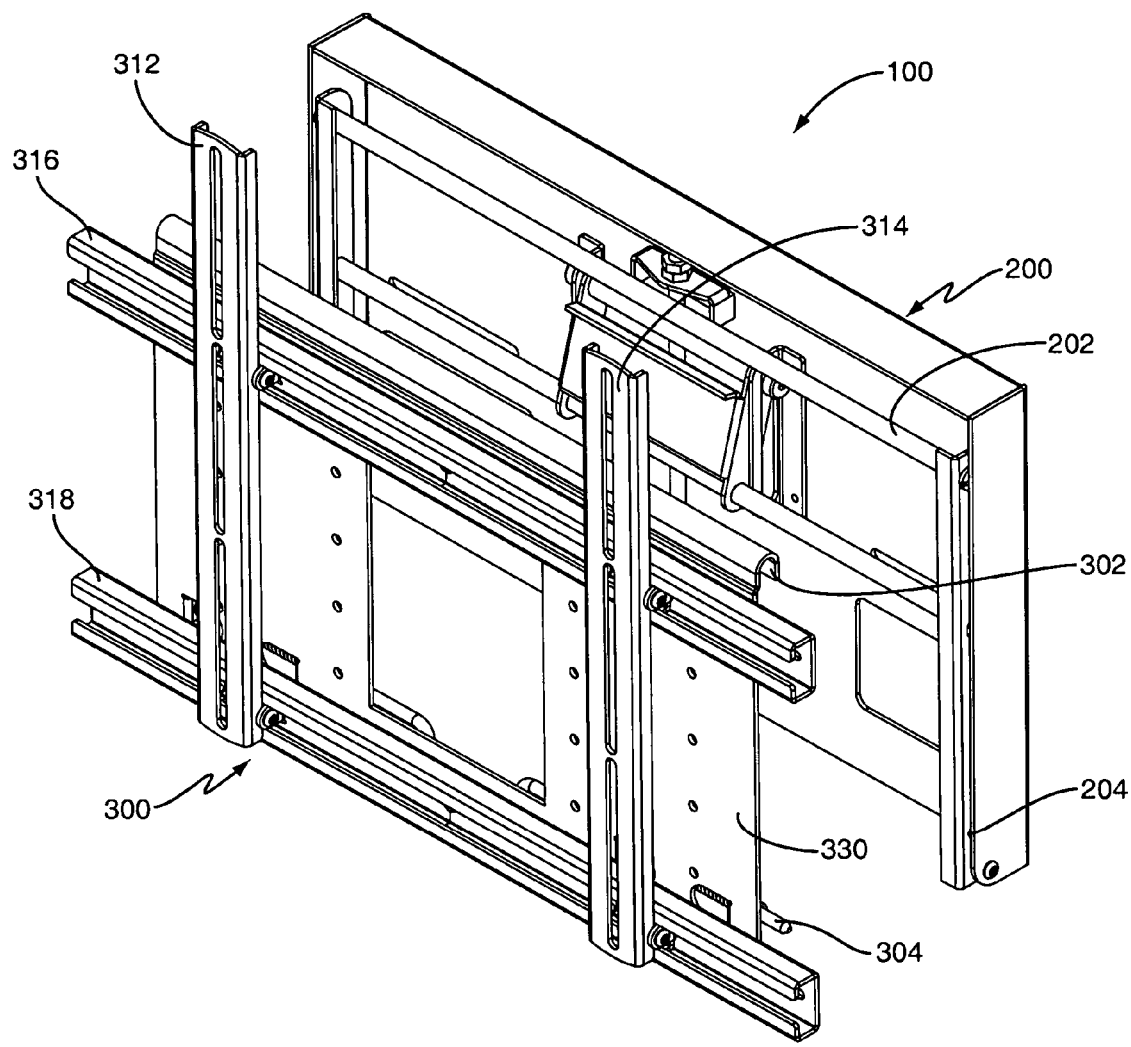
FIG. 1 is an expanded perspective view of a flat panel display wall mounting system according to an embodiment of the invention.

FIG. 1 illustrates an expanded perspective view of a flat panel display wall mounting system according to an embodiment of the invention. As shown in FIG. 1, the flat panel display WMS 100 includes a wall plate assembly 200 and a flat panel display mounting rack assembly 300. A U-shaped channel 302 is formed on the flat panel display mounting rack assembly 300 and configured to engage a bar 202 on the wall plate assembly so that the two structures (200, 300) may be joined during installation.

To install a flat panel display on a wall, the wall plate assembly 200 and the flat panel display mounting rack assembly 300 are separated. The wall plate assembly 200 is attached to the wall using appropriate anchoring mechanisms disposed through angled slots 212. The use of angled slots 212 enables the wall plate assembly to be leveled on the wall so that it is not critical for the wall anchors to be inserted into the wall in a perfectly horizontal manner. Once the wall plate assembly is leveled, additional anchors may be used for example in horizontal slots 212 to further secure the wall plate assembly to the wall.

The flat panel display mounting rack assembly 300 is also mounted to the flat panel display while the flat panel display is on the ground. This enables the flat panel display to be secured to the mounting system before being hoisted up onto the vertical surface of the wall, to reduce the chance that the flat panel display will be inadvertently dropped.

Once the flat panel display mounting rack assembly is connected to the flat panel display, and the wall plate assembly 200 is attached to the wall, the flat panel display may be lifted into position and so that U-shaped channel 302 of the mounting rack assembly may engage bar 202 of the wall plate assembly. This enables the flat panel display to be hung on the wall plate assembly after being connected to the mounting rack assembly.

A pin assembly 304 is movable relative to the flat panel display mounting rack assembly 300 so that it may selectively engage one or more holes 204 in the wall plate assembly 200. When the pin assembly 304 is engaged with the hole(s) 204 of the wall plate assembly, the flat panel display mounting rack assembly 300 is securely attached to the wall plate assembly 200 and prevented from moving relative thereto. However, when the pin assembly 304 is disengaged from the holes 204 of the wall plate assembly, the U-shaped channel is allowed to rotate on bar 202 so that the flat panel display mounting rack assembly may be pivoted away from the wall plate assembly. As shown in FIGS. 8A-8D, pivoting the flat panel display mounting rack assembly away from the wall plate assembly enables the back of the flat panel display to be made accessible so that the flat panel display may be serviced while remaining mounted to the flat panel display wall mounting system 100.

The wall plate assembly and the flat panel display mounting rack assembly may include many additional features, the details of which will be described in greater detail below. For example, the wall plate assembly 200 may optionally include a pitch adjustment assembly as well to enable the viewing angle of the flat panel display to be adjusted while hanging on the wall. Similarly, the flat panel display mounting rack assembly may include an adjustment assembly to enable a given flat panel display wall mount system 100 to be used in connection with flat panels of different sizes. The invention is not limited to an embodiment that includes all of these selected features or only these selected features, however, as the flat panel display wall mounting system may be configured with many different combinations of features.

Figure 2:
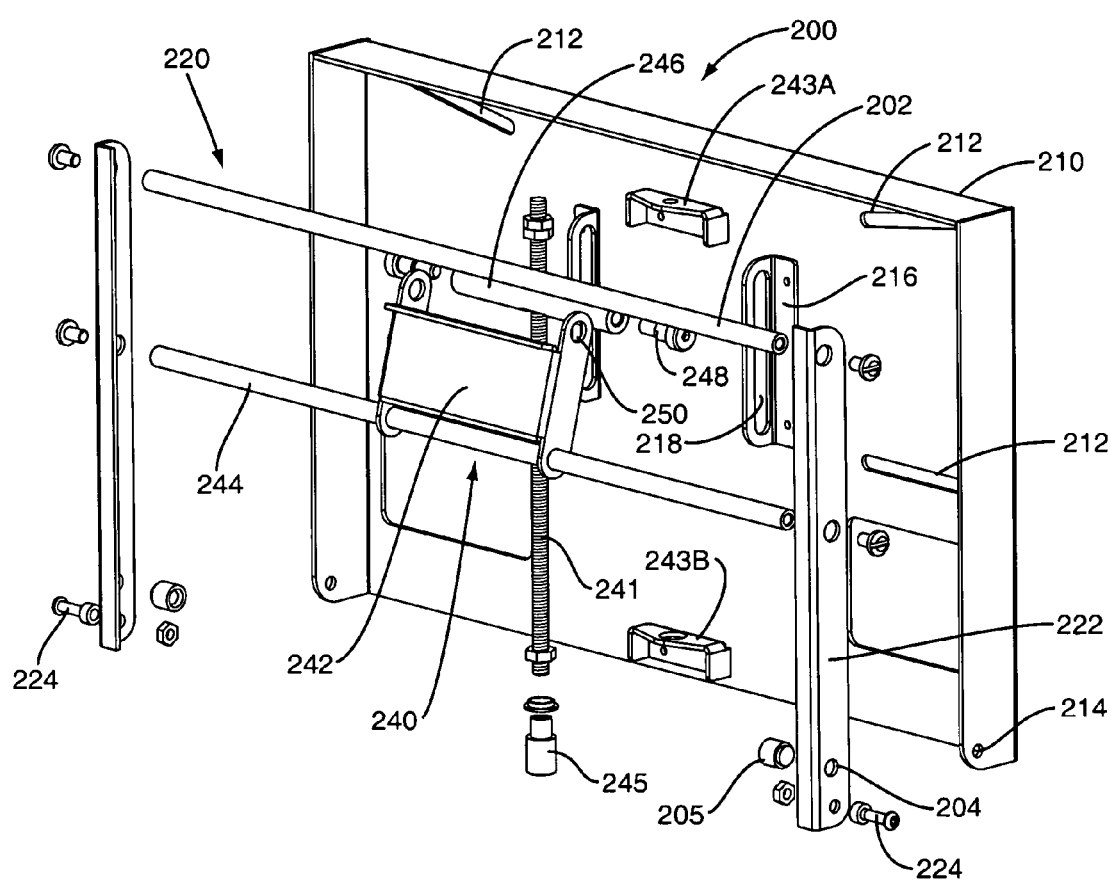
FIG. 2 is an expanded perspective view of a wall plate assembly of the flat panel display wall mounting system of FIG. 1 according to an embodiment of the invention.

FIG. 2 is an expanded perspective view of a wall plate assembly of the flat panel display wall mounting system of FIG. 1 according to an embodiment of the invention. As shown in FIG. 2, the wall plate assembly 200 includes a tray 210 configured to be attached to a wall so that the flat panel display wall mounting system may be secured to a wall or other vertical surface. The tray 210 in the illustrated embodiment includes a plurality of elongated apertures 212 through which appropriate mounting hardware, such as bolts, screws, and brackets, may be used to attach the tray to the wall.

In the embodiment shown in FIG. 2, the upper elongated apertures 212 are angled relative to horizontal so that lateral movement of the wall plate assembly will enable the wall plate assembly to be leveled during installation. Specifically, a person installing the wall plate assembly may insert two wall anchors through upper angled apertures 212 to temporarily secure the wall plate assembly to the wall. The position of the wall plate assembly may then be adjusted so that the wall plate assembly slides on the wall anchors upwards/downwards on the angled apertures. This will enable the wall plate assembly to be leveled during the installation process without requiring the wall anchors to be perfectly horizontal. Once the wall plate assembly is leveled, the wall anchors may be fully tightened and additional wall anchors may be inserted through the lower elongated apertures 212.

The wall plate assembly 200, in the illustrated embodiment, also includes a pitch assembly 220 configured to connect to the flat panel display mounting rack assembly. The pitch assembly in the illustrated embodiment is configured to attach on a bottom edge to the tray 210 in a pivotal manner such that the pitch assembly may be rotated out of the tray 210. For example, in the illustrated embodiment the pitch assembly has a plurality of vertical arms 222 that are connected by pins 224 through apertures 214 in the tray 210. The pins 224 may be bolts or other suitable connection mechanisms. By connecting the arms of the pitch assembly via pins 224, the arms may be rotated out of the tray 210 so that the FPG mounting rack assembly, connected thereto, may similarly be rotated away from the tray 210. This enables the pitch of the flat panel display to be adjusted relative to the wall.

To secure the pitch assembly relative to the tray 210 so that a flat panel display mounted thereto may be maintained at a desired pitch, the pitch assembly includes a pitch angle maintenance mechanism. In the illustrated embodiment, the pitch angle maintenance mechanism 240 has an arm 242 interconnected between a central rod 244 that is connected to the arms 222, and a sliding rod 246. The sliding rod 246 has a threaded aperture that is configured to receive a threaded rod 241 and is configured to be received in one or more brackets on the tray 210. Specifically, in the illustrated embodiment, pins 248 connected to opposite ends of the sliding rod 246 pass through elongated apertures 218 in a pair of brackets 216 and mating holes 250 in arm 242 so that the arm 242 may be moved relative to the bracket 216. The threaded rod 241 is received in upper and lower brackets 243A, 243B on the tray 210.

In operation, the threaded rod 241 is rotated about its axis to cause the sliding rod 246 to move up and down on the threaded rod. The up and down movement of the sliding rod 246 causes the rod to move within the elongated apertures 218 of the brackets 216 so that the upper end of the arm 242 is moved up/down relative to the tray. The vertical movement of this arm causes the pitch of the flat panel display mounting rack to be adjusted. The threaded rod 241 may include a hexagonal coupling 245 configured to receive an Allen wrench. By using a cordless drill fitted with an appropriate Allen attachment, quick adjustment of the pitch of the flat panel display may be effected before the flat panel is attached or afterwards.

Optionally, once the pitch has been set, the pins 248 may be tightened relative to the sliding rod 246 to further secure the pitch angle. Although a particular pitch adjustment mechanism has been illustrated in this embodiment, the invention is not limited to use with this particular pitch adjustment mechanism. Rather, other linkage mechanisms may be used to adjust the pitch of the vertical arms so that the pitch of a flat panel display may be adjusted relative to the surface on which the tray 210 is mounted.

Figure 3:
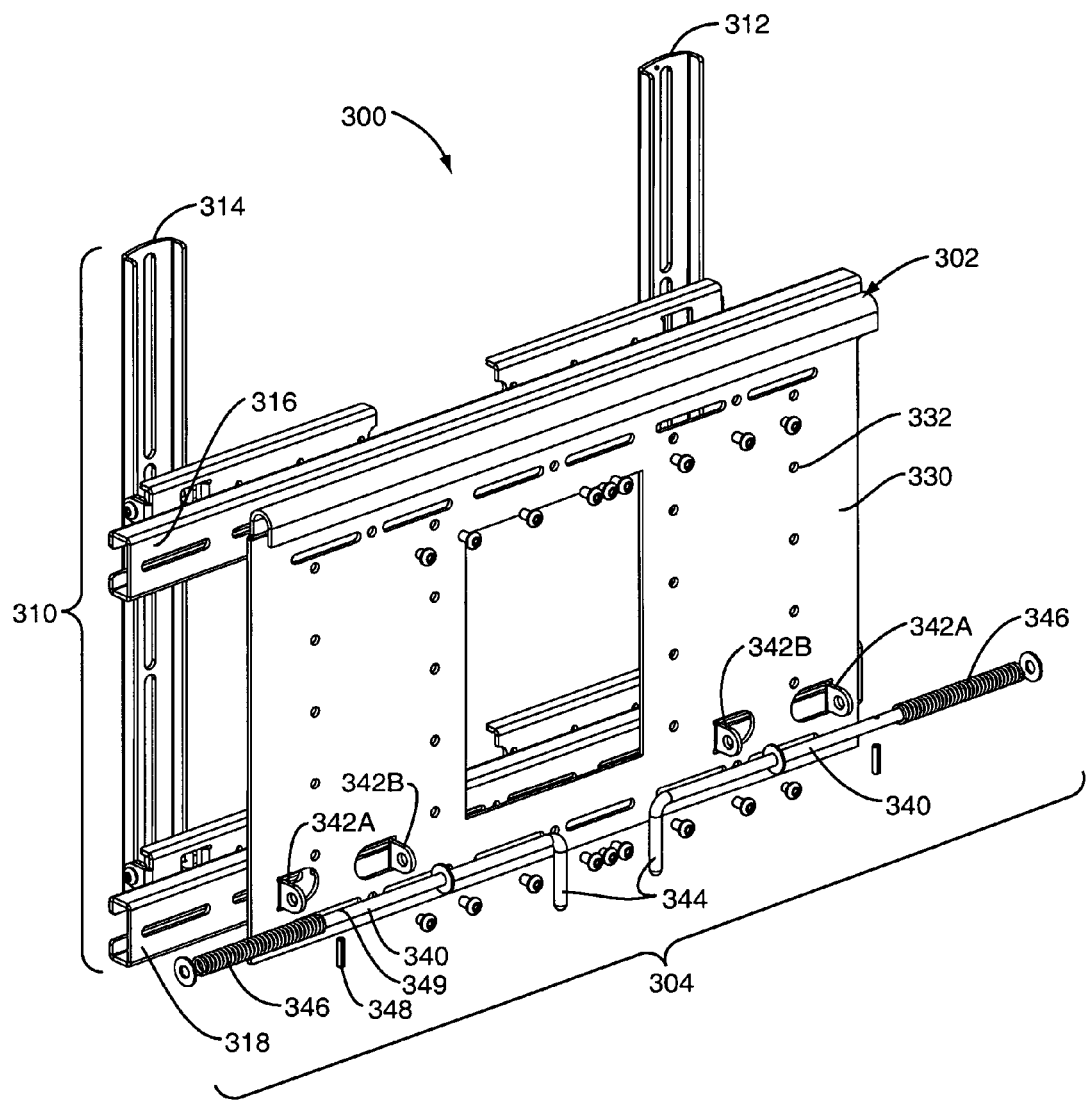
FIG. 3 is an expanded perspective view of a flat panel display mounting rack assembly of the flat panel display wall mounting system of FIG. 1 according to an embodiment of the invention.

FIG. 3 is an expanded perspective view of a flat panel display mounting rack assembly of the flat panel display wall mounting system of FIG. 1 according to an embodiment of the invention. As shown in FIG. 3, the flat panel display mounting rack assembly includes an adjustable frame configured to be connected to different sized flat panel displays. The frame in this embodiment has a left mount rack 312 and a right mount rack 314. The left and right mount racks are attached to rails 316, 318 so that they are laterally movable relative to each other.

Figure 5:
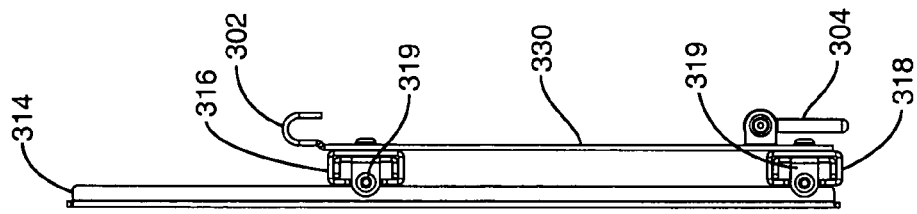
FIG. 5 is a side elevational view of the flat panel display mounting rack assembly of FIG. 3.
Figure 4:
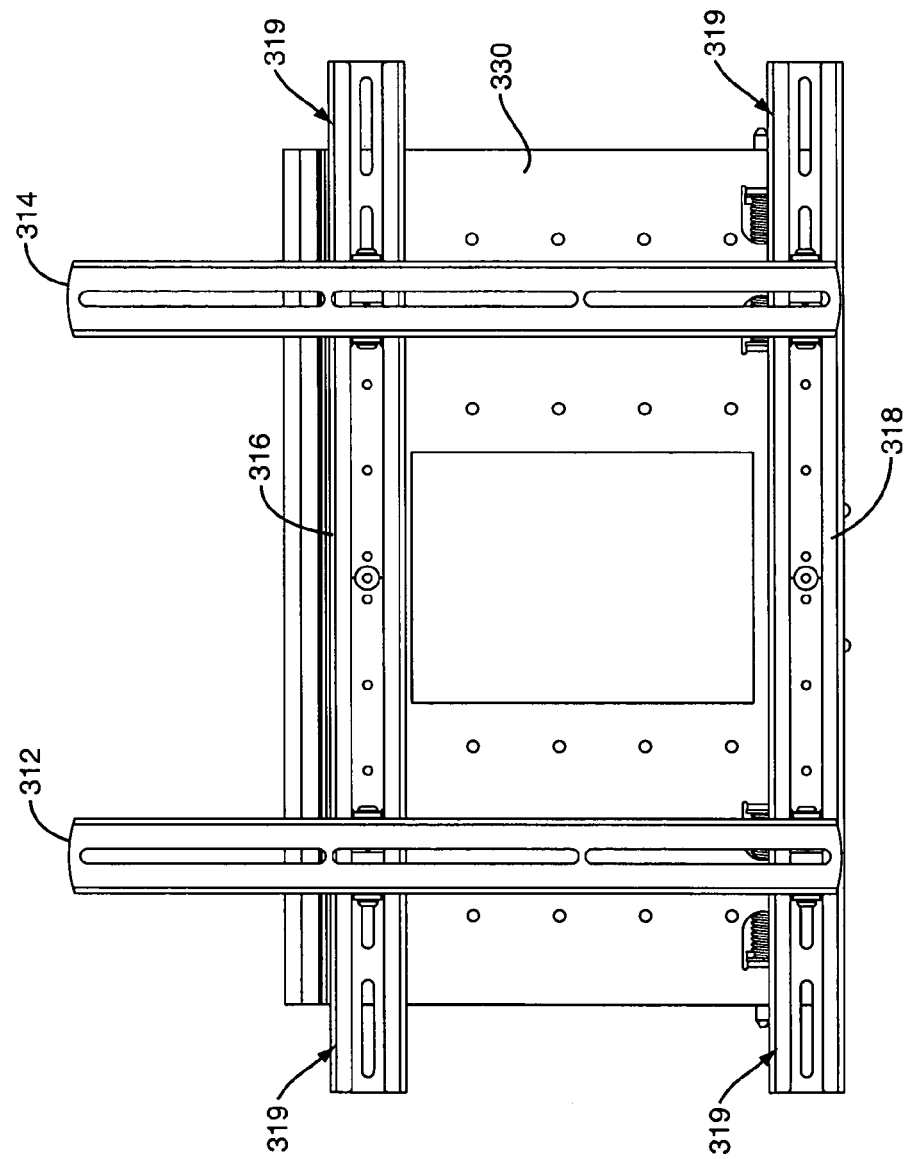
FIG. 4 is a front elevational view of the flat panel display mounting rack assembly of FIG. 3.

FIG. 4 shows the adjustable frame in greater detail and FIG. 5 shows the flat panel display mounting rack assembly from the side. As shown in FIGS. 1, 3, and 4, the left and right mount racks are attached to slides 319 that are configured to fit into channels formed in the rails 316, 318. The slides may be moved horizontally within the channels and, when appropriately positioned, a set screw or other securing mechanism may be used to fix the slide at the desired horizontal position within the channel in the rail. In this manner the horizontal position of the left and right mount racks may be adjusted to accommodate different sized flat panel displays.

The rails are attached to a plate 330. The plate, in this embodiment, has a plurality of sets of holes 332 configured to enable the rails to be secured to the plate 330 at different vertical positions. The plate 330 also carries the U-shaped channel 302 which allows the flat panel display wall mounting rack to be attached to the bar 202 on the wall plate assembly.

The plate 330 also carries the pin assembly 304 that enables the flat panel display mounting rack assembly 302 to be tilted out for servicing. In the illustrated embodiment, the pin assembly 304 includes two elongated rods 340 that are designed to fit through apertures in brackets 342 (342A, 342B) on plate 330. One end 344 of each of the rods 340 is bent downward to form a handle so that the rod may be moved laterally within bracket 342.

In the embodiment shown in FIGS. 3, the pin assembly is biased outward away from the center of the plate 330 by a compression spring 346. To assemble each side of the pin assembly, the rod 340 is inserted through a first aperture in the inner bracket 342B on plate 330 and a compression spring 346 is then inserted over the rod. The rod 344 is then inserted through an aperture in the outer bracket 342A. A roll pin 348 is then inserted through an aperture 349 in the rod 344 such that the compression spring is trapped between the inner bracket 342B and the roll pin 348. The roll pin 348 enables the spring to assert force the rod 344 to bias the end of the rod outward away from the center of the plate 330.

In operation, the rod 344 will naturally be biased outward away from the center of the plate 330 so that the rod will tend to engage holes 204 in the vertical arms 222. Optionally, a lug 205 may be provided and attached to the holes 204 to increase the acceptable horizontal engaging area between the ends of the rods and the holes 204.

Although the pin assembly 304 in the illustrated embodiment shows rods that are biased into engagement with the holes 204 of the wall plate assembly, the invention is not limited in this manner as other pin assemblies may be constructed in different manners. Accordingly the invention is not limited to the particular embodiment shown in these figures and described herein but rather extends to differently constructed pin assemblies as well.

Figure 6:
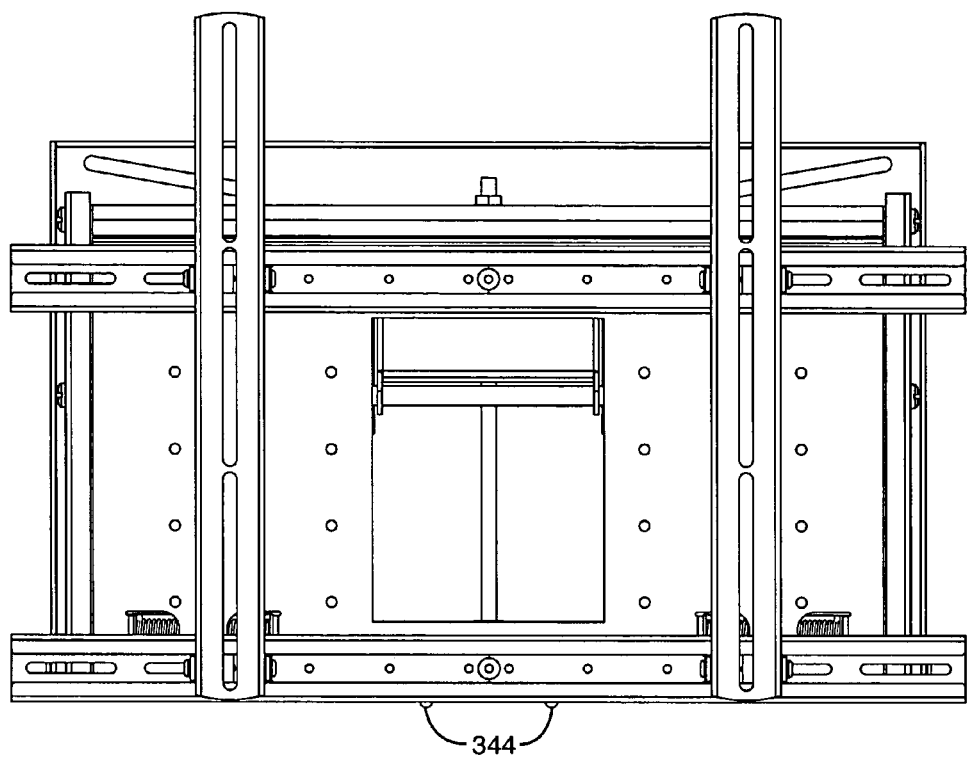
FIG. 6 is a front elevational view of the flat panel display wall mounting system of FIG. 1.
Figure 7:
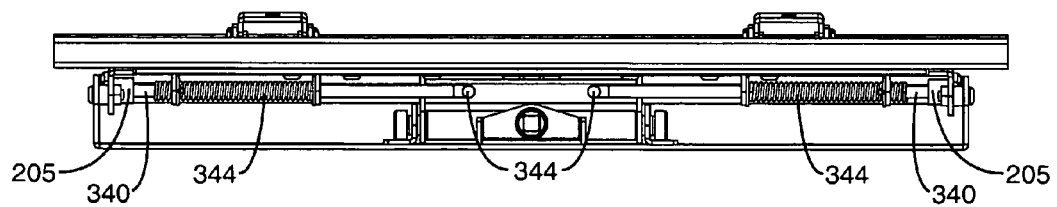
FIG. 7 is a top elevational view of the flat panel display wall mounting system of FIG. 1.

FIG. 6 shows the flat panel display mounting system as it would appear once mounted on a vertical surface such as a wall, and FIG. 7 shows a bottom view of the flat panel display mounting system. As shown in FIG. 6, the racks are available to attach to a flat panel display so that the flat panel display may be mounted on the flat panel display wall mounting system. As shown in FIG. 7, to service a flat panel display once mounted, the technician may grasp the handle portions 344 of the pin assembly 304 and slide the rods of the pin assembly 304 against the biasing force of the springs 346 to cause the ends of the rods 340 to disengage the lugs 205. This will allow the bottom portion of the flat panel display mounting rack assembly to be able to be moved relative to the wall plate assembly while the weight of the flat panel display is born by the U-shaped channel 302. Since the U-shaped channel 302 will remain engaged with bar 202 during this process, the weight of the flat panel display will continue to be supported by the flat panel display wall mounting system even after the rods of the pin assembly 304 are retracted.

Figure 8A:
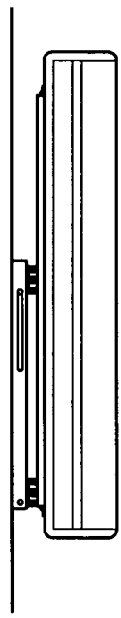
FIGS. 8A-8D are a series of side views of a flat panel display mounted to the flat panel display wall mounting system of FIG. 1 in different in-use configurations.
Figure 8B:
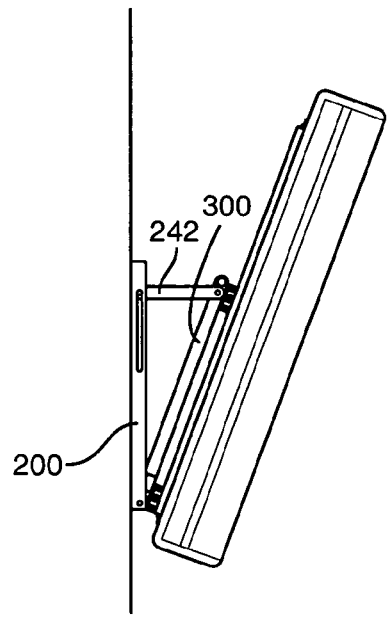

FIGS. 8A-8D are a series of side views of a flat panel display mounted to the flat panel display wall mounting system of FIG. 1 in different in-use configurations. As shown in FIG. 8A, the flat panel display wall mounting system may be used to mount a flat panel display flat to the wall. Also, where the flat panel display wall mounting system includes a pitch adjustment mechanism, such as the embodiment illustrated in FIGS. 1-7, the pitch of the flat panel display may be adjusted so that the top portion of the flat panel display is extended away from the wall.

Figure 8C:
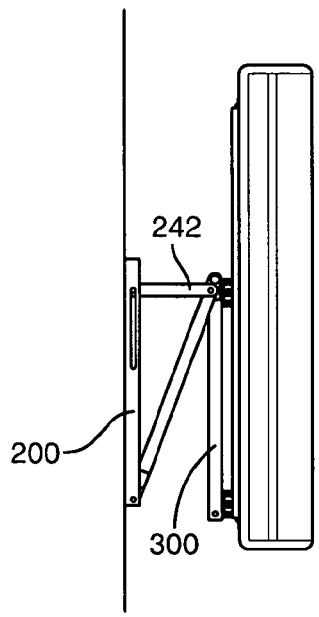
Figure 8D:
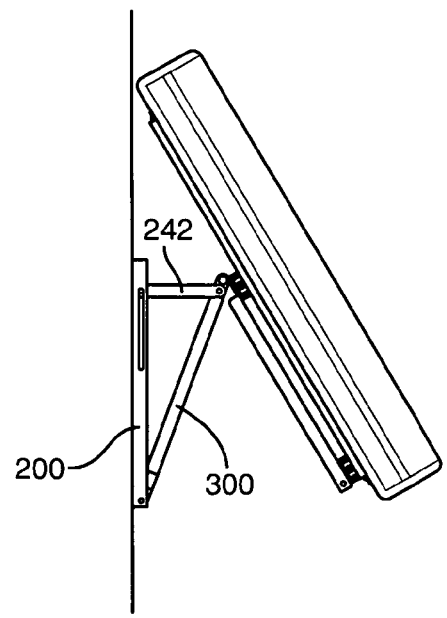

As shown in FIGS. 8C and 8D, where it is necessary or desirable to gain access to the back of the flat panel display, the pin mechanism may be used to detach the bottom portion of the flat panel display mounting rack assembly from the wall plate assembly so that the back side of the flat panel display may be made accessible. Specifically, disengagement of the pin assembly 304 enables the flat panel display mounting rack assembly to be partially exposed as shown in FIG. 8C, for example to attach cables to the flat panel display, or to be more exposed as shown in FIG. 8D where more extensive service is required to be performed on the flat panel display.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A flat panel display wall mounting system, comprising:
a wall plate assembly configured to attach to a wall and containing a first bar and at least a first aperture;
a flat panel display mounting rack assembly containing a channel configured to engage the first bar to support the flat panel display mounting rack assembly relative to the wall plate assembly, and a pin assembly configured to selectively engage the first aperture of the wall plate assembly to selectively secure the flat panel display mounting rack assembly relative to the wall plate assembly;
wherein the pin assembly comprises a first elongated rod and a first spring configured to engage the first elongated rod to bias the rod outward toward engagement with the first aperture.

2. The flat panel display wall mounting system of claim 1, wherein the channel is U-shaped.

3. The flat panel display wall mounting system of claim 1, wherein the wall plate assembly and flat panel display mounting rack assembly are able to be disconnected such that the channel is able to selectively engage the first bar.

4. The flat panel display wall mounting system of claim 3, wherein die wall plate assembly is configured to be able to be mounted to a wall prior to engaging the flat panel display mounting rack assembly.

5. The flat panel display wall mounting system of claim 1, wherein the wall plate assembly includes a plurality of elongated apertures to enable it to be secured to a wall via wall anchors.

6. The flat panel display wall mounting system of claim 5, wherein the plurality of elongated apertures comprise a pair of upwardly angled elongated apertures configured to enable the wall plate to be leveled once secured to the wall and a pair of horizontal elongated apertures.

7. The flat panel display wall mounting system of claim 1, wherein the wall plate assembly further comprises a second aperture, and wherein the pin assembly comprises a second elongated rod and a second spring configured to engage the second elongated rod to bias the rod outward toward engagement with the second aperture.

8. The flat panel display wall mounting system of claim 7, wherein the first and second springs are coaxial with the first and second elongated rods.

9. The flat panel display wall mounting system of claim 7, wherein the flat panel display mounting rack assembly comprises a plate carrying brackets configured to confine movement of the first and second rods.

10. The flat panel display wall mounting system of claim 9, wherein the flat panel display mounting rack assembly includes an adjustable frame attached to the plate and configured to be connected to different sized flat panel displays.

11. The flat panel display wall mounting system of claim 10, wherein the adjustable frame comprises a plurality of rails, and a left mount rack and a right mount rack connected to the rails.

12. A flat panel display wall mounting system, comprising:
- a wall plate assembly configured to attach to a wall and containing a first bar and at least a first aperture;
- a flat panel display mounting rack assembly containing a channel configured to engage the first bar to support the flat panel display mounting rack assembly relative to the wall plate assembly, and a pin assembly configured to selectively engage the first aperture of the wall plate assembly to selectively secure the flat panel display mounting rack assembly relative to the wall plate assembly; and
- a pitch assembly configured to selectively adjust a pitch of the flat panel display mounting rack assembly relative to the wall plate assembly.

13. The flat panel display wall mounting system of claim 12, wherein the pitch assembly comprises a plurality of vertical arms pivotally connected to a tray, said tray being configured to attach to a wall, and wherein said rod is connected to said vertical arms.

14. The flat panel display wall mounting system of claim 13, wherein the first aperture is formed in one of said vertical arms.

15. The flat panel display wall mounting system of claim 14, further comprising a second rod interconnecting the vertical arms, and wherein the pitch assembly connects to the second rod.

16. The flat panel display wall mounting system of claim 15, wherein the pitch assembly comprises a threaded rod rotatably connected between brackets attached to the tray, a movable piece threadably engaged to the threaded rod, and an arm connecting between the movable piece and the second rod.

17. The flat panel display wall mounting system of claim 16, wherein the pitch assembly further comprises a head configured to receive an Allen wrench.

18. The flat panel display wall mounting system of claim 17, wherein the adjustable frame comprises a plurality of rails, and a left mount rack and a right mount rack connected to the rails.

19. A flat panel display wall mounting system, comprising:
- a wall plate assembly configured to attach to a wall and containing a first bar and at least a first aperture; and
- a flat panel display mounting rack assembly containing a channel configured to engage the first bar to support the flat panel display mounting rack assembly relative to the wall plate assembly, and a pin assembly configured to selectively engage the first aperture of the wall plate assembly to selectively secure the flat panel display mounting rack assembly relative to the wall plate assembly;
- wherein the flat panel display mounting rack assembly includes an adjustable frame configured to be connected to a flat panel display before the flat panel display is mounted on a wall.

* * * * *